United States Patent [19]
Kashiwagi et al.

[11] Patent Number: 5,802,390
[45] Date of Patent: Sep. 1, 1998

[54] DATA BUS CIRCUIT AND METHOD OF CHANGING OVER TERMINATION RESISTOR OF THE DATA BUS CIRCUIT

[75] Inventors: Kenji Kashiwagi, Minamiashigara; Akira Yamagiwa, Kanagawa-ken; Masao Inoue, Sagamihara, all of Japan

[73] Assignee: Hitachi, Ltd., Tokyo, Japan

[21] Appl. No.: 411,461

[22] Filed: Mar. 28, 1995

[30] Foreign Application Priority Data

Mar. 31, 1994 [JP] Japan .................................. 6-062778

[51] Int. Cl.$^6$ .................................................. G06F 13/00
[52] U.S. Cl. .................... 395/821; 395/306; 395/750.03; 395/287; 326/30
[58] Field of Search .................................. 395/821, 306, 395/287, 288, 750, 750.03, 750.06, 750.08; 326/30; 333/22 R

[56] References Cited

U.S. PATENT DOCUMENTS

| | | | |
|---|---|---|---|
| 5,067,143 | 11/1991 | Watanabe et al. | 378/110 |
| 5,117,331 | 5/1992 | Gebara | 361/775 |
| 5,239,559 | 8/1993 | Brach et al. | 375/257 |

Primary Examiner—Jack B. Harvey
Assistant Examiner—Ario Etienne
Attorney, Agent, or Firm—Antonelli, Terry, Stout, & Kraus, LLP

[57] ABSTRACT

A data bus circuit includes a plurality of data buses, a plurality of data processing units connected to each of the data buses for performing transmission and reception of data in response to a transmission control signal, at least a termination resistor connected to termination of the plurality of data buses, the termination resistor including a first resistance circuit for suppressing reflection of signals on the plurality of data buses upon transmission and reception of data of the plurality of data processing units and a second resistance circuit having a resistance value larger than that of the first resistance circuit, an output control circuit for producing the transmission control signal as to whether the plurality of data processing units perform transmission and reception of data or not, and a changing-over circuit for changing over to connect the first resistance circuit to the data buses through which transmission and reception of data is performed when at least one of the plurality of data processing units performs transmission and reception of data in response to the transmission control signal and to connect the second resistance circuit to the data buses through which transmission and reception of data is not performed when any of the plurality of data processing units does not perform transmission and reception of data, whereby a current flowing in the termination resistor can be reduced when data is not transmitted on the data bus and the low power consumption of the data bus circuit can be attained.

13 Claims, 9 Drawing Sheets

DATA BUS CIRCUIT AND METHOD OF CHANGING OVER TERMINATION RESISTOR OF THE DATA BUS CIRCUIT

BACKGROUND OF THE INVENTION

The present invention relates to a termination circuit of a data bus circuit for transmitting data, and more particularly to a data bus circuit capable of changing over a resistance value of the termination circuit to a resistance value close to a characteristic impedance of the data bus circuits or a resistance value larger than the characteristic impedance and a method of changing over at least a termination resistor of the data bus circuit.

At present, the low power consumption in a computer or the like attracts attention as green PC as described in "ELECTRONICS", 1993, July, pp. 5 to 6. There is a tendency that a current flowing in a termination resistor cannot be neglected. In addition, as U.S. patent applications pertinent to the present invention, there are the U.S. Pat. application Ser. No. 08/388,990 and 08/269,352 filed with the declaration of the priority based on Japanese Patent Applications No. JP-6-18082 filed on Feb. 15, 1994 and JP-5-334631 filed on Dec. 28, 1993 entitled "SIGNAL TRANSMITTING DEVICE SUITABLE FOR FAST SIGNAL TRANSMISSION" by Toshitsugu TAKEKUMA et al, and U.S. patent application Ser. No. 08/360,326 filed on Dec. 21, 1994 entitled Transmission/Reception Circuit by R. YOSHINO, now U.S. Pat. No. 5,514,983.

SUMMARY OF THE INVENTION

It is an object of the present invention to provide a data bus circuit capable of attaining a low power consumption and a changing-over method of at least a termination resistor of the data bus circuit.

A first aspect in an embodiment of the present invention resides in a data bus circuit comprising a plurality of data buses; a plurality of data processing units connected to each of the data buses for performing transmission and reception of data in response to a transmission control signal; at least a termination resistor connected to termination of the plurality of data buses, the termination resistor including a first resistance circuit for suppressing reflection of signals on the plurality of data buses upon transmission and reception of data of the plurality of data processing units and a second resistance circuit having a resistance value larger than that of the first resistance circuit; an output control circuit for producing the transmission control signal as to whether or not the plurality of data processing units perform transmission and reception of data; and a changing-over circuit for changing over to connect the first resistance circuit to the data buses through which transmission and reception of data is performed when at least one of the plurality of data processing units performs transmission and reception of data in response to the transmission control signal and to connect the second resistance circuit to the data buses through which transmission and reception of data is not performed when any of the plurality of data processing units does not perform transmission and reception of data.

The changing-over circuit may include a transmission delay circuit for delaying data reaching to the termination circuit when the second resistance circuit is changed over to the first resistance circuit in response to the transmission control signal and a changing-over delay circuit for changing over from the first resistance circuit to the second resistance circuit after an elapse of a predetermined time after completion of transmission of data of the plurality of data processing units when the first resistance circuit is changed over to the second resistance circuit in response to the transmission control signal.

The transmission control signal produced by the output control circuit enables and disables signals produced by the output control circuit itself or presence of data transmitted on the data bus.

The transmission delay circuit increases a transmission time, due to the length of the data bus between the data processing unit nearest to the termination resistor and the termination resistor, to be longer than a changing-over time of the changing-over circuit.

The transmission delay circuit includes delay lines, each connected between termination of each of the plurality of data buses and the termination resistor.

The changing-over delay circuit includes a delay circuit connected to the output control circuit for delaying the transmission control signal to be transmitted to the changing-over circuit.

The output control circuit is included in each of the plurality of data processing units and produces enable and disable signals.

The output control circuit includes at least a comparator for comparing a voltage level of data transmitted on the data bus with a reference voltage to thereby produce the transmission control signal in accordance with the presence of data transmitted on the data bus.

A second aspect in an embodiment of the present invention resides in a method of changing over at least a termination resistor of a data bus circuit including a plurality of data buses; a plurality of data processing units connected to each of the plurality of data buses for performing transmission of data in accordance with a transmission control signal; and the termination resistor provided in termination of the plurality of data buses and having a first resistance circuit for suppressing reflection of signals on the plurality of data buses upon data transmission of the plurality of data processing units and a second resistance circuit having a resistance value larger than that of the first resistance circuit; The termination resistor is changed over in accordance with a data transmission state of the plurality of data buses. The method includes the step of changing over from the second resistance circuit to the first resistance circuit when any of the plurality of data processing units transmits data on all of the plurality of data buses to connect the first resistance circuit to the plurality of data buses in order to suppress reflection of signals on the plurality of data buses, delaying data reaching to the termination circuit when the termination resistor is changed over from the second resistance circuit to the first resistance circuit, and changing over from the first resistance circuit to the second resistance circuit after an elapse of a predetermined time upon completion of data transmission of the plurality of data processing units.

With the above configuration, the first resistor circuit is connected to the plurality of data buses upon data transmission of the plurality of data processing units and the second resistance circuit is connected to the plurality of data buses when any data processing unit does not transmit data to thereby connect the first resistance circuit having the resistance value close to the characteristic impedance of the data bus to the data bus when data is transmitted so that reflection of the signal on the data bus is suppressed. Further, the second resistance circuit having the resistance value larger than that of the first resistance circuit is connected to the data bus when data is not transmitted on the data bus to thereby reduce a current flowing in the termination resistor and the low power consumption of the data bus circuit can be attained.

DESCRIPTION OF THE PREFERRED EMBODIMENTS

Embodiments of the present invention are now described with reference to the accompanying drawings.

Figure 1:
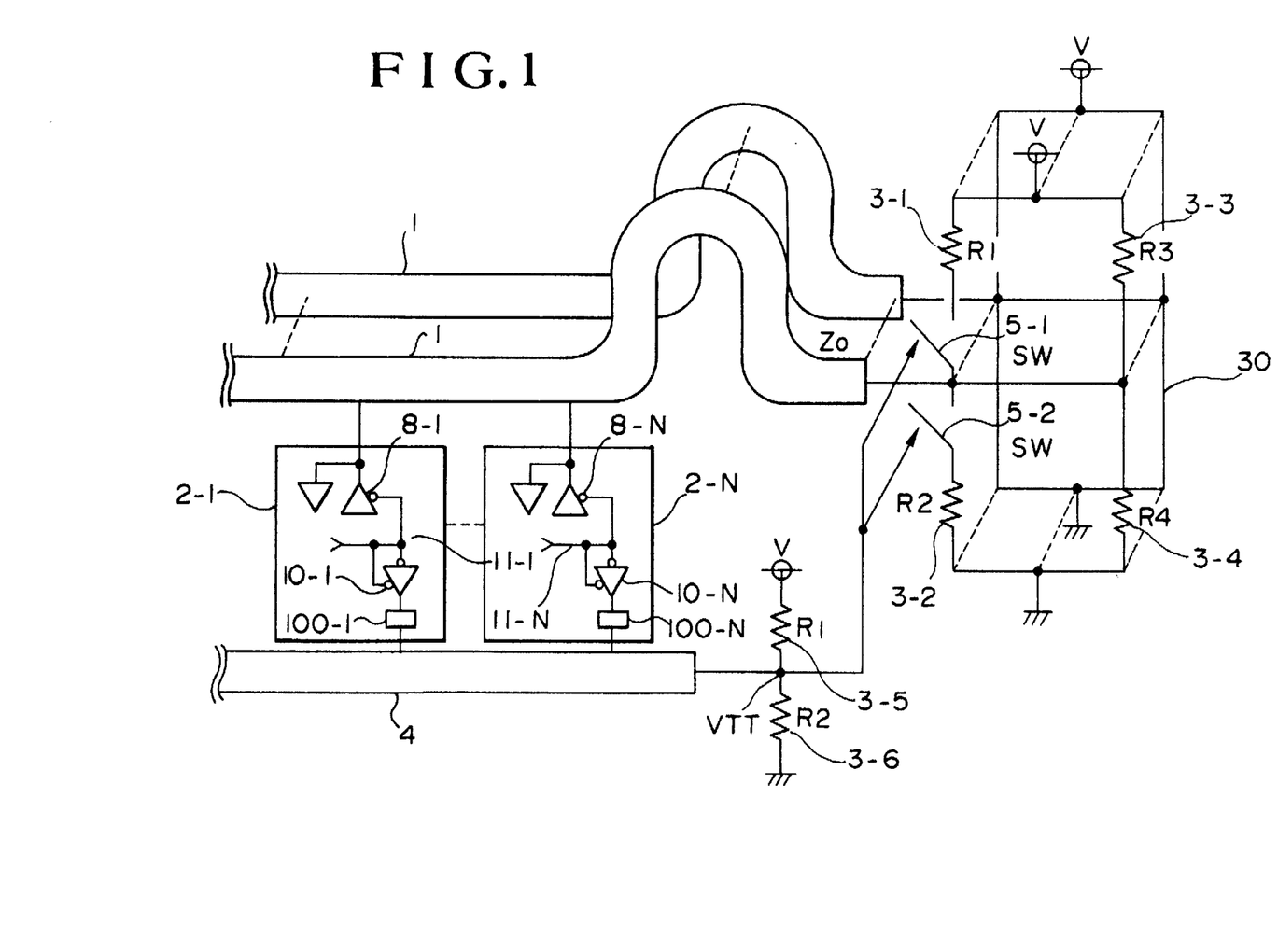
FIG. 1 is a schematic diagram illustrating a first embodiment of a data bus circuit of the present invention.

FIG. 1 is a schematic diagram illustrating a data bus circuit according to a first embodiment of the present invention. In FIG. 1, a plurality of data processing units 2-1 to 2-N are connected to a data bus 1 for transmitting data. The data processing units 2-1 to 2-N include transmitting and receiving portions 8-1 to 8-N, respectively, for transmitting and receiving data. In FIG. 1, a plurality of data buses 1 are provided. Connected to each of the data buses 1 is a termination circuit 30 for preventing reflection, and the termination circuit 30 includes termination resistors 3-1, 3-2, 3-3 and 3-4 and switches 5-1 and 5-2. The switches 5-1 and 5-2 are constituted by MOS transistors and are controlled by enable and disable signals 11-1 to 11-N produced by timing adjustment circuits 100-1 to 100-N of the data processing units. The data processing units 2-1 to 2-N include output control circuits 10-1 to 10-N for producing the enable and disable signals 11-1 to 11-N for controlling the switches 5-1 to 5-2 onto a transmission control signal line 4, respectively. The output control ircuits 10-1 to 10-N produce enable and disable signals of transmitting circuits of the data processing units.

Further, when resistance values of the termination resistors 3-1, 3-2, 3-3 and 3-4 are R1, R2, R3 and R4, respectively, the resistance values of the termination resistors have the following relation:

$$R1/R2 = R3/R4 \ldots \quad (1)$$

$$R1 \ll R3, R2 \ll R4$$

Further, when the switches 5-1 and 5-2 are conductive, the following relation is satisfied:

$$Z0 = 1/(1/R1 + 1/R2 + 1/R3 + 1/R4) \ldots \quad (2)$$

where Z0 is the characteristic impedance of the data bus 1.

When the switches 5-1 and 5-2 are nonconductive, the following relation is satisfied.

$$Z0 \ll R3*R4/(R3+R4) \ldots \quad (3)$$

More particularly, a resistance value of the termination circuit 30 is close to the characteristic impedance of the data bus 1 when the switches 5-1 and 5-2 are conductive and the resistance value of the termination circuit 30 is larger than the characteristic impedance of the data bus 1 when the switches 5-1 and 5-2 are nonconductive. When data is transmitted on the data bus 1, the output signal level produced by the output control circuit is set to a high level (enable signal) so as to turn on the switches 5-1 and 5-2 so that the resistance value formed by the termination resistors 3-1 to 3-4 of the termination circuit 30 is close to the characteristic impedance of the data bus 1. When data is not transmitted on the data bus 1, the output signal level is set to a termination voltage level (disable signal) so as to turn off the switches 5-1 and 5-2 so that the resistance value formed by the termination resistors 3-1 to 3-4 of the termination circuit 30 is larger than the characteristic impedance of the data bus 1. In addition, the output control circuits 10-1 to 10-N and termination resistors 3-5 and 3-6 are connected to the transmission control signal line 4.

Figure 11:
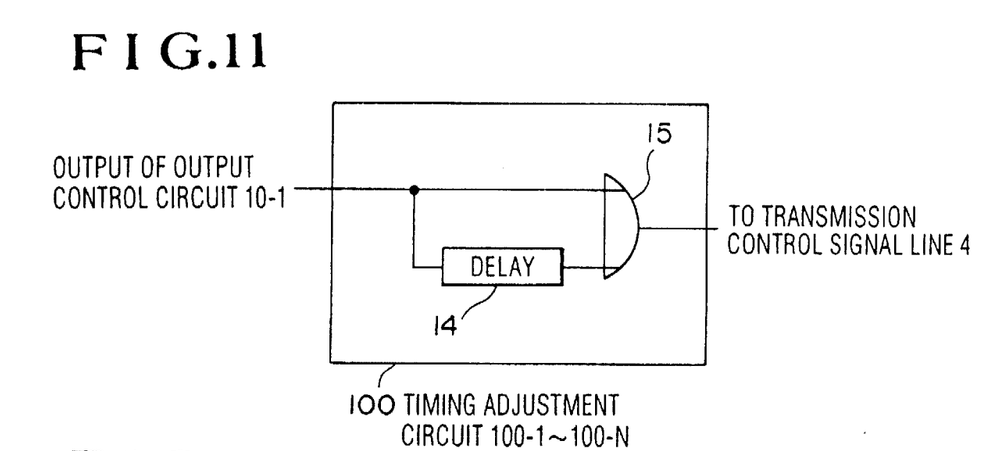
FIG. 11 is a circuit diagram illustrating a timing adjustment circuit shown in FIG. 1.
Figure 12:
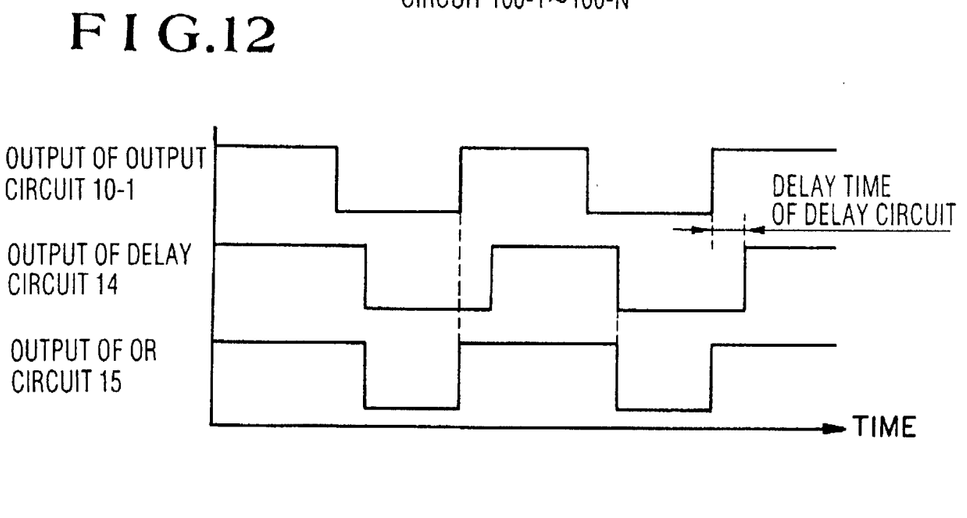
FIG. 12 is a timing chart showing operation of the timing adjustment circuit shown in FIG. 11.

Further, in consideration of a switching delay time of the switches 5-1 and 5-2, a transmission path length of the data bus 1 between the data processing unit 2-N closest to the termination circuit 30 and the termination circuit 30 is made longer than that of the transmission control signal line 4 so that a transmission delay time of data on the data bus 1 is longer than the switching delay time of the switches 5-1 and 5-2. The output control circuits 10-1 to 10-N produce a high level signal (enable signal) together with transmission of data, while when the output control circuits produce a disable signal, the output control circuits maintain the signal level on the transmission control signal line 4 to high level during at least a threshold time derived by subtracting the switching delay time of the switches 5-1 and 5-2 from a transmission time corresponding to the extended length of the data bus 1 between the data processing unit 2-N and the termination circuit 30 and then change the signal level to the termination voltage level. In order to prevent the switches 5-1 and 5-2 from being changed over while data transmitted on the data bus 1 has not reached the termination circuit 30 when the enable output signal is changed over to the disable output signal, the high level is maintained during the predetermined time in consideration of the transmission time corresponding to the extended length of the data bus 1 and the switching delay time of the switches 5-1 and 5-2. The maintenance of the high level is performed by adding the timing adjustment circuits 100-1 to 100-N to the outputs of the output control circuit 10-a to 10-N, respectively. The timing adjustment circuits 100-1 to 100-N are schematically illustrated in FIG. 11. As shown in FIG. 11, the timing adjustment circuits 100-1 to 100-N each having a predetermined delay time are inserted to thereby maintain the high level during the predetermined time.

A termination voltage level is determined by a resistance division ratio of the termination circuit 30 and a termination power supply level V and can be expressed by the following equation (4):

$$VTT = V*R2/(R1+R2) \quad (4)$$
$$= V*(R2//R4)/(R1//R3 + R2//R4)$$

The switches 5-1 and 5-2 are on when the signal level on the transmission control signal line 4 is a high level (enable signal) and are off when it is a termination level (disable level)(VTT).

Figure 9:
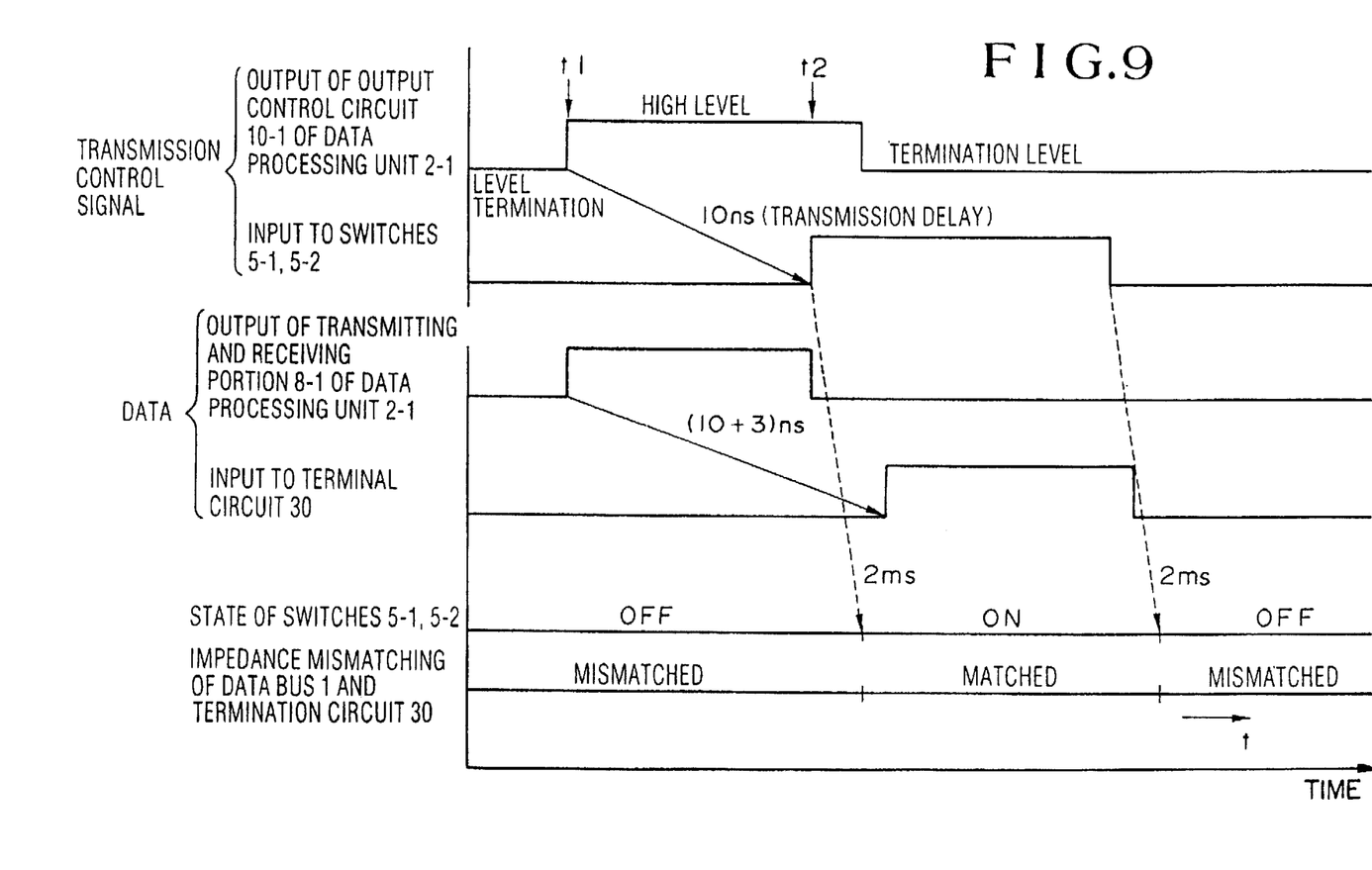
FIG. 9 is a timing chart showing operation of the data bus circuit shown in FIG. 1.

Referring now to FIG. 9, the changing over operation of the termination circuit 30 is described. FIG. 9 is a timing chart showing output levels of the output control circuit 10-1 of the data processing unit 2-1 and the transmitting and receiving portion 8-1, an input level to the termination circuit 30, an operation state of the switches 5-1 and 5-2, and a matching state of the impedance. In FIG. 9, it is assumed that a transmission delay time of the data bus 1 and the transmission control signal line 4 is 10 ns/m, a transmission path length of the data bus 1 from the data processing unit 2-1 to the termination circuit 30 is 1300 mm and a transmission path length of the transmission control signal line 4 is 1000 mm. Thus, since the transmission path length of the data bus 1 is longer than that of the transmission control signal line 4 by 300 mm, the transmission delay time of the data bus 1 is larger than that of the transmission control signal line 4 by 3 ns. Further, the switching delay time of the switches 5-1 and 5-2 is assumed to be 2 ns. The output control circuit 10-1 is adapted to maintain the enable state during at least a threshold time (3 ns–2 ns=1 ns) derived by subtracting the switching delay time of the switches 5-1 and 5-2 from the transmission delay time of the data bus 1 when the enable state is changed over to the disable state and the maintenance time is assumed to be 2 ns.

Operation when the data processing unit 2-1 starts data transmission (at t1 of FIG. 9) is now described. The output control circuit 10-1 becomes the output enable state and produces a high level signal. Thus, a voltage level on the transmission control signal line 4 is changed from the termination voltage level VTT to a high level in response to the high level signal produced by the output control circuit 10-1 and a voltage level to the switches 5-1 and 5-2 is changed from the termination level VTT to a high level after the transmission delay time of 10 ns to thereby turn on the switches 5-1 and 5-2. The switches 5-1 and 5-2 becomes conductive after the switching delay time of 2 ns. Since the resistors 3-1 to 3-4 of the termination circuit 30 are all connected through the switches, a current $I_1$ flowing in the termination circuit 30 at this time is given by the following equation (5):

$$I_1=V/\{(R1+R2)*(R3+R4)/(R1+R2+R3+R4)\} \ldots \quad (5)$$

In this state, since the impedance of the termination circuit 30 is close to the characteristic impedance of the data bus 1, the impedance matching is attained. Further, data transmitted from the transmitting and receiving portion 8-1 of the data processing unit 2-1 is supplied to the termination circuit 30 after 13 ns due to the transmission delay time. At this time, the switches 5-1 and 5-2 have been changed over and accordingly the impedance matching is attained.

Operation immediately after completion of data transmission of the data processing unit 2-1 (at t2 of FIG. 9) is now described. The transmitting and receiving portion 8-1 of the data processing unit 2-1 sets its output level to an output disable state after transmission of data, and the output control circuit 10-1 of the data processing unit 2-1 maintains its output level to a high level during a time of 2 ns and then sets the output level to an output disable state to produce the termination voltage level VTT. The voltage level of the transmission control signal line 4 is changed from a high level to the termination level VTT in response to the output level of the output control circuit 10-1 and the switches 5-1 and 5-2 are turned off when the voltage level of the transmission control signal line 4 becomes the termination level VTT. The switches 5-1 and 5-2 are changed over to the off state after the switching delay time of 2 ns. At this time only the termination resistors 3-3 and 3-4 are connected in the termination circuit 30 and accordingly a current $I_2$ flowing in the termination circuit 30 at this time is given by the following equation (6):

$$I_2=V/(R3+R4) \ldots \quad (6)$$

Since the resistance values of the resistors R3 and R4 are larger than those of the resistors R1 and R2 as defined by the conditional equation (1), the currents $I_1$, and $I_2$ have the relation as defined by the following equation (7):

$$I_2 \ll I_1 \ldots \quad (7)$$

As described above, the current flowing in the termination circuit 30 can be reduced when data is not transmitted. Further, the data bus line is extended to exceed the switching delay time of the switches 5-1 and 5-2 in consideration of the switching delay time of the switches 5-1 and 5-2 upon transmission of data and changing over of the switches 5-1 and 5-2 is delayed by the time or more derived by subtracting the switching delay time of the switches 5-1 and 5-2 from the time produced by extending the data bus line after transmission of data to thereby change over the resistance value without influence on the transmission of data.

Figure 2:
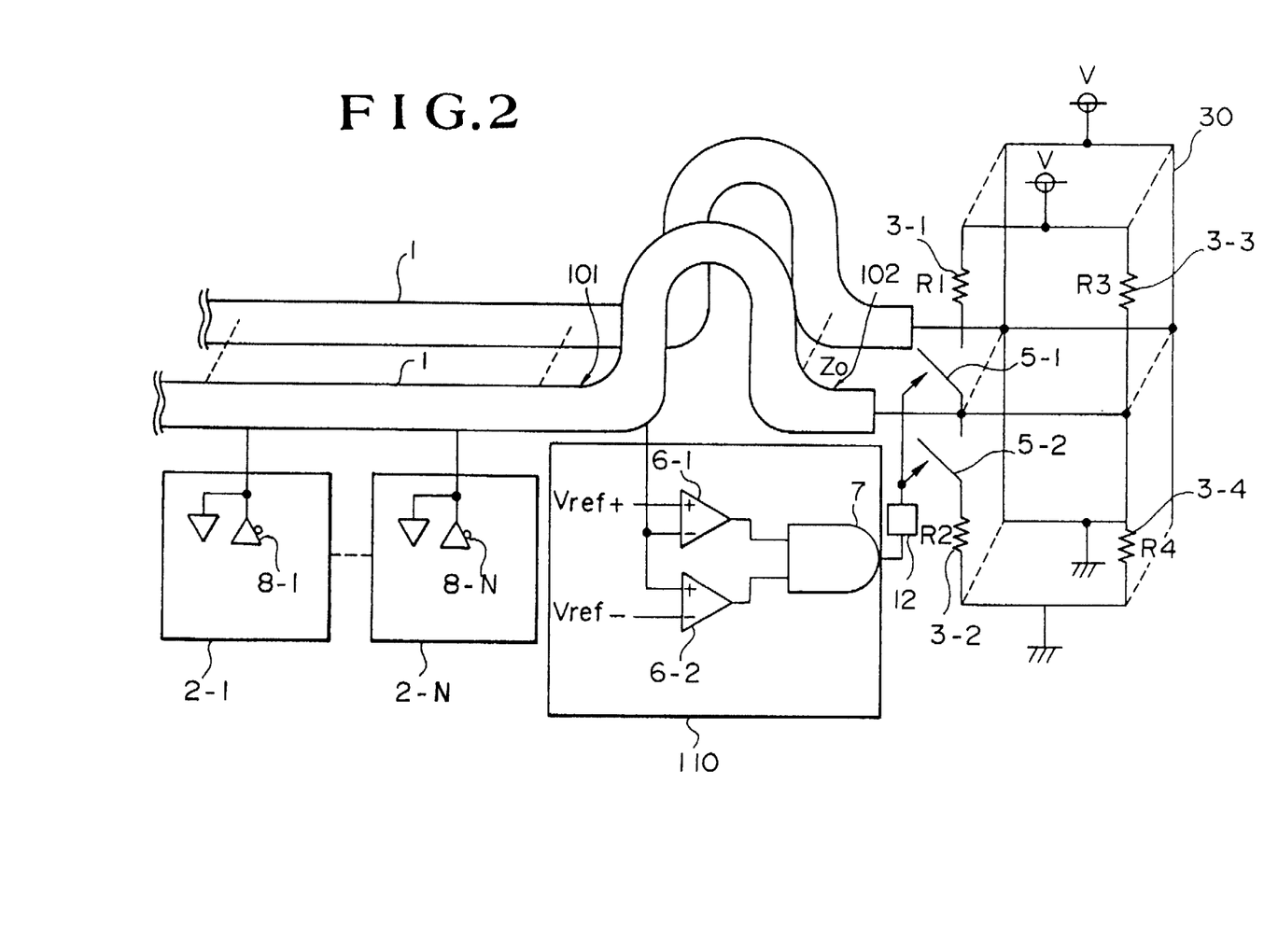
FIG. 2 is a schematic diagram illustrating a second embodiment of a data bus circuit of the present invention.
Figure 4:
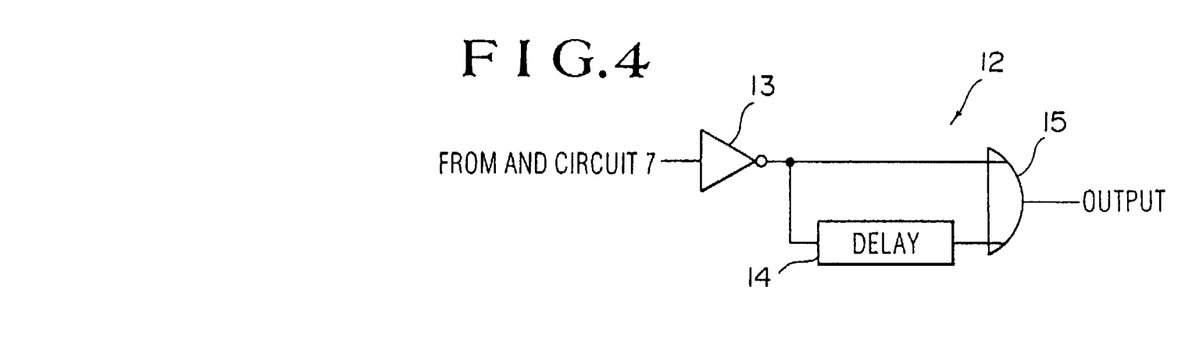
FIG. 4 is a circuit diagram of a timing adjustment circuit in the data bus circuit shown in FIG. 2.
Figure 5:
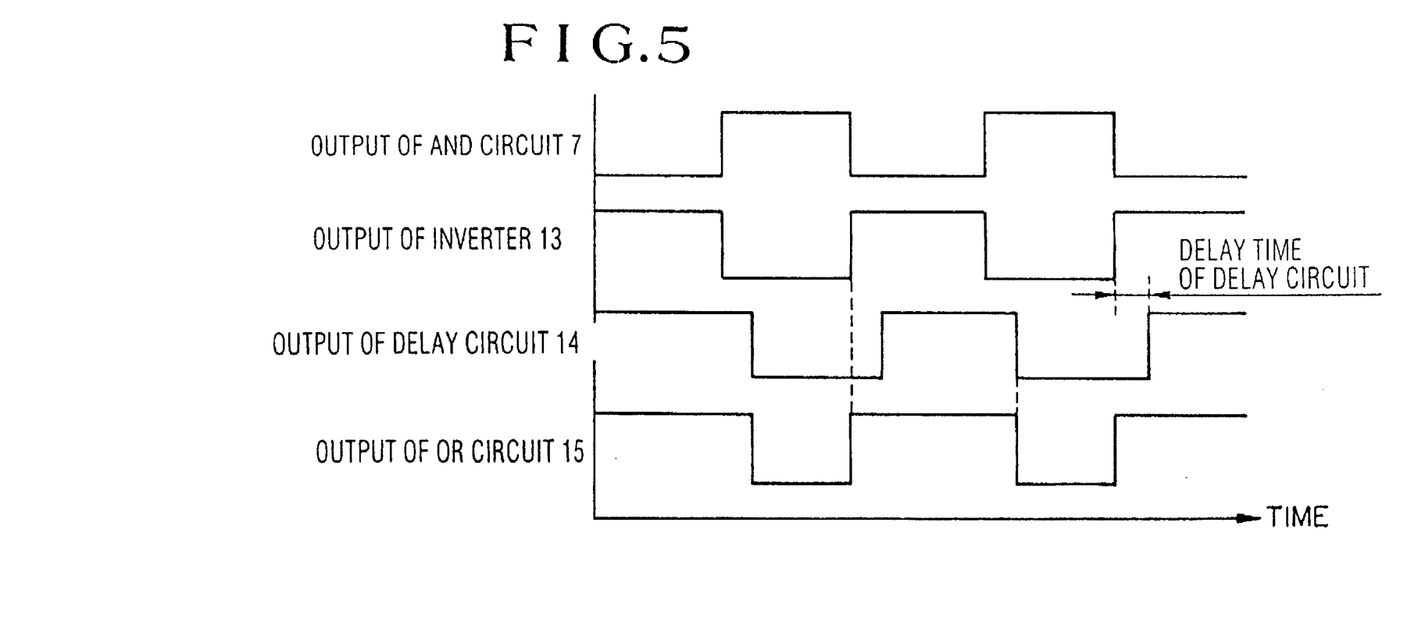
FIG. 5 is a timing chart showing operation of the timing adjustment circuit shown in FIG. 4.

A second embodiment is now described. FIG. 2 is a schematic diagram illustrating a data bus circuit according to the second embodiment. Elements having the same function as that of FIG. 1 are designated by the same reference numerals. The embodiment of FIG. 2 is different from FIG. 1 in that the data processing units 2-1 to 2-N do not include the output control circuits 10-1 to 10-N and instead a single output control circuit 110 is provided in common. The output control circuit 110 is operated in accordance with a usage state of the data bus 1 and includes comparators 6-1 and 6-2 and an AND circuit 7. The comparator 6-1 compares a voltage of data from the data bus 1 with a predetermined reference voltage Vref+ and the comparator 6-2 compares a voltage of data from the data bus 1 with a predetermined reference voltage Vref so that both of the comparators produce the compared results. The compared results from the comparators 6-1 and 6-2 are supplied to the AND circuit 7 to detect the transmission and reception time of data. A timing adjustment circuit 12 functions to hold a low output level of the AND circuit 7 temporarily. That is, the timing adjustment circuit 12 functions to maintain its output level at a high level during a predetermined time in consideration of the transmission time corresponding to the extended length of the data bus between the data processing unit 2-N and the termination circuit 30 and the switching delay time in the same manner as in the first embodiment. An example of a circuit diagram of the timing adjustment circuit 12 is shown in FIG. 4. The timing adjustment circuit 12 includes an inverter circuit 13, a delay circuit 14 and an OR circuit 15. FIG. 5 is a timing chart showing operation of the timing adjustment circuit 12 shown in FIG. 4. A delay time of the delay circuit 14 is set to at least a threshold time derived by subtracting the switching delay time of the switches 5-1 and 5-2 from the transmission time corresponding to the extended length of the data bus 1. Arrows 101 and 102 illustrated in FIG. 2 show specific locations of the data bus 1.

Figure 3:
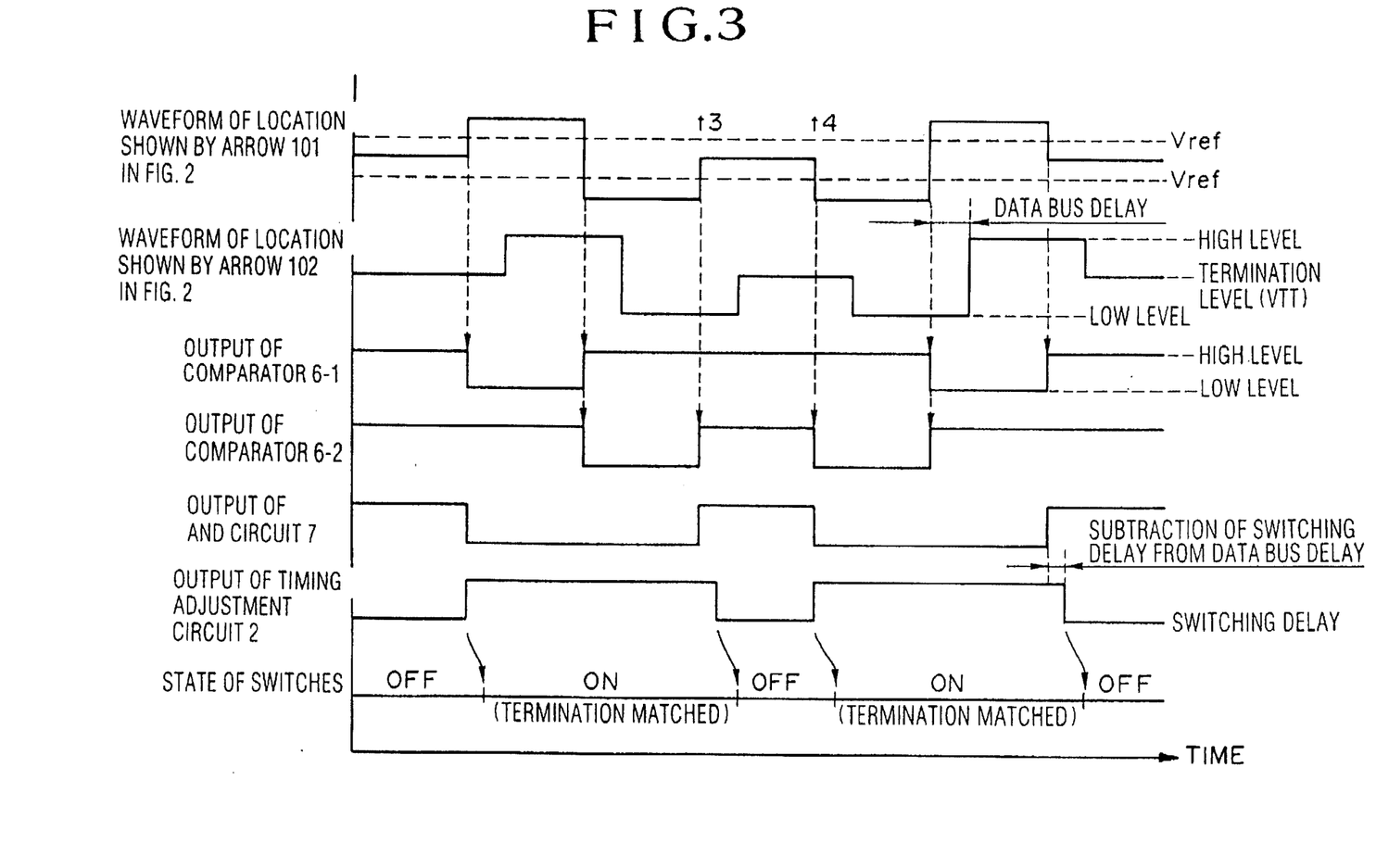
FIG. 3 is a timing chart showing operation of the data bus circuit shown in FIG. 2.

Referring now to FIGS. 3 and 4, the changing over operation of the termination circuit 30 is described. FIG. 3 is a timing chart showing operation of the embodiment. The reference voltage Vref+ in the output control circuit 110 is set to be slightly higher than the termination voltage level VTT and the reference voltage Vref− is set to be slightly lower than the termination voltage level VTT so that the termination voltage level VTT is positioned between both the reference voltages. The comparators 6-1 and 6-2 monitor the signal level on the data bus 1 and only when the signal level is lower than the reference voltage Vref+ and is higher than the reference voltage Vref−, the AND circuit 7 produces a high level output signal (in the unused state of the data bus 1) and produces a low level output signal except that (in the used state of the data bus 1).

Operation when any data processing unit terminates data transmission (at t3 of FIG. 3) is now described. When data transmission is completed, a voltage level on the data bus 1 becomes the termination level VTT and accordingly the AND circuit 7 of the output control circuit 110 produces a high level output signal. When the AND circuit 7 produces the high level output signal, the inverter circuit 13 of the timing adjustment circuit 12 produces a low level output signal, while the OR circuit 15 produces a low level output signal after the delay time of the delay circuit 14 as shown in FIG. 5. When the output of the timing adjustment circuit 12 becomes low, the switches 5-1 and 5-2 are turned off. When the switches 5-1 and 5-2 are turned off, only the resistors 3-3 and 3-4 are connected in the termination circuit 30 and accordingly a current 13 flowing in the termination circuit 30 at this time is expressed by the following equation (8):

$$I_3 = V/(R3+R4) \quad \ldots \quad (8)$$

The case where a data processing unit starts data transmission (at t4 of FIG. 3) from the above state is now considered. Since the data processing unit sends out data to be transmitted onto the data bus 1, the AND circuit 7 of the output control circuit 110 produces a low level output signal. When the timing adjustment circuit 12 receives the low level output signal from the AND circuit 7 of the output control circuit 110, the OR circuit 15 produces a high level output signal. When the output of the OR circuit 15 becomes high, the switches 5-1 and 5-2 are turned on. Thus, the resistors 3-1 to 3-4 in the termination circuit 30 are all connected and accordingly a current $I_4$ flowing in the termination circuit 30 at this time is expressed by the following equation (4):

$$I_4 = V/\{(R1+R2)*(R3+R4)/(R1+R2+R3+R4)\} \quad \ldots \quad (9)$$

Since the resistors R1 and R2 have resistance values larger than those of the resistors R3 and R4 as defined by the above condition, the currents $I_3$ and $I_4$ have the relation as defined by the following equation (10):

$$I_3 < I_4 \quad \ldots \quad (10)$$

As described above, by detecting whether or not data is transmitted/received through the data bus 1, the switches 5-1 and 5-2 of the termination circuit 30 can be controlled to reduce the current flowing in the termination circuit 30 in the unused state of the bus. Further, when the termination circuit 30 is changed over from the high resistance to approximately the characteristic impedance, the data bus line is extended to exceed the switching delay time of the switches 5-1 and 5-2 and when the termination circuit 30 is changed over from approximately the characteristic impedance to the high resistance, the changing over of the resistors 3-1 to 3-4 is delayed by at least a threshold time derived by subtracting the switching delay time of the switches 5-1 and 5-2 from the transmission time corresponding to the extended length of the data bus line to thereby change over the resistance value of the termination circuit without influence on the transmission of data.

Figure 10:
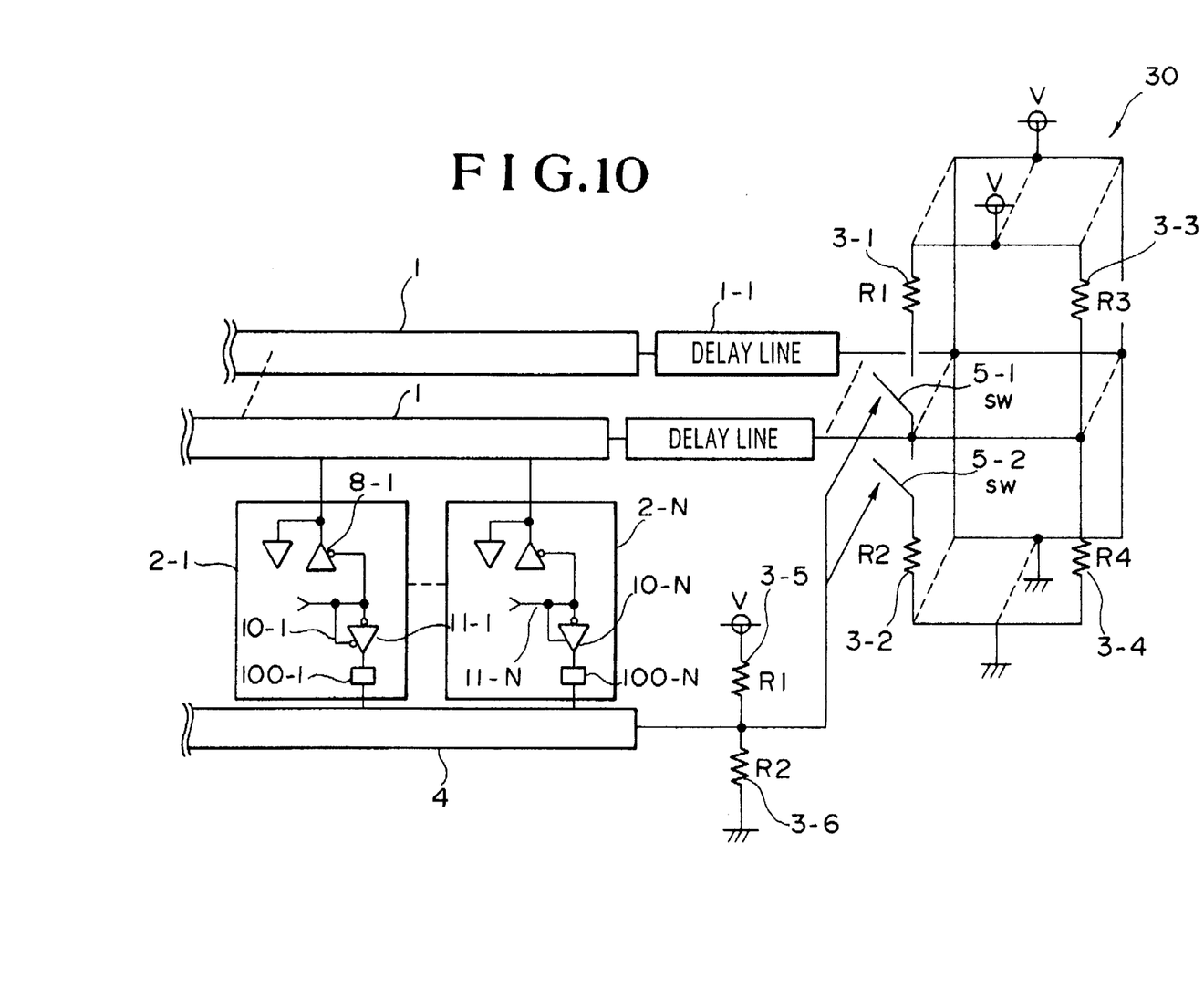
FIG. 10 is a schematic diagram illustrating a third embodiment of a data bus circuit of the present invention.

A third embodiment of the present invention is now described. FIG. 10 is a schematic diagram illustrating a data bus circuit according to the third embodiment. Elements having the same function as those of FIG. 1 are designated by the same reference numerals. The embodiment of FIG. 10 is different from the embodiment of FIG. 1 in that a delay line 1—1 for delaying transmission of data is inserted between the termination circuit 30 and the data processing unit 2-N instead of extension of the length of the data bus 1 between the data processing unit 2-N and the termination circuit 30. The delay time of the delay line 1—1 is equal to the transmission delay time increased by the extended length of the transmission path in the first embodiment, that is, the delayed time larger than the switching delay time of the switches 5-1 and 5-2. Thus, the low power consumption can be attained without extension of the length of the transmission path and influence of the switching delay time.

Actual calculation examples of the termination current in the first, second and third embodiments are now described. It is assumed that V=3.3 v, Z0=45 Ω, R1=100 Ω, R2=100 Ω, R3=900 Ω and R4=900 Ω. At this condition, the current flowing in the termination and the power consumption therein are given by the following equation (11):
(When the termination has a high resistance, that is, when the data bus 1 is not used)

$$\begin{aligned} I &= V/(R3+R4) \quad (11)\\ &= 3.3/(900+900) = 1.83 \text{ mA} \\ P &= (R3+R4) \times I^2 \\ &= 1800*(0.00183)^2 = 6 \text{ mW} \end{aligned}$$

(When the termination has about the characteristic impedance, that is, when the data bus 1 is used)

$$\begin{aligned} I &= V/((R1+R2)*(R3+R4)/(R1+R2+R3+R4)) \\ &= 3.3/(200*1800/2000) = 18.33 \text{ mA} \\ P &= (R1+R2)*(R3+R4)/(R1+R2+R3+R4)*I^2 \\ &= 180*(0.001833)^2 = 60 \text{ mW} \end{aligned}$$

In this manner, it is understood that the power consumption in the unused state of the data bus can be reduced to one tenth thereof in the used state to thereby attain low power consumption. Further, the present invention is effective for the bus having the lower activation rate.

Figure 6:
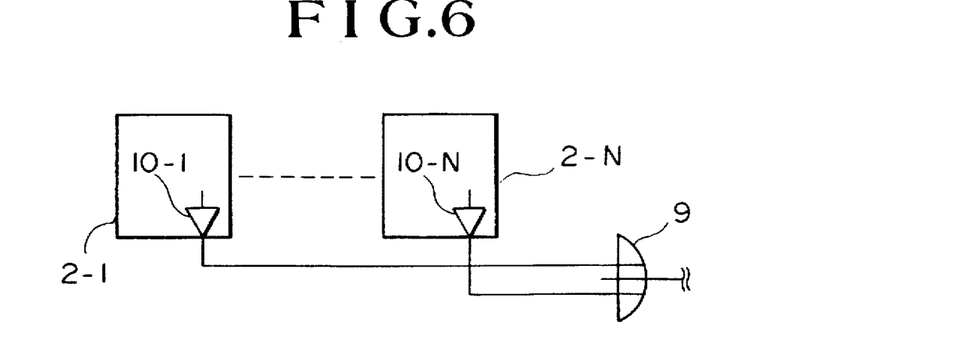
FIGS. 6, 7 and 8 are circuit diagrams showing examples of an output control circuit and a transmission control signal line.
Figure 7:
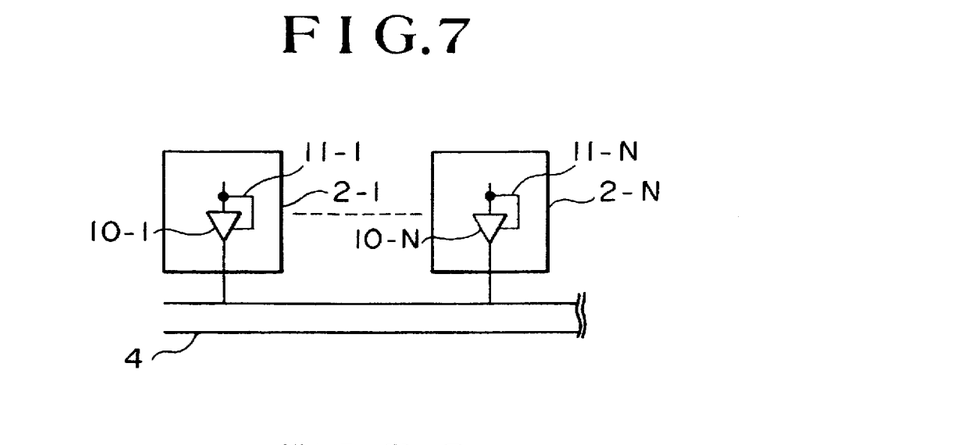
Figure 8:
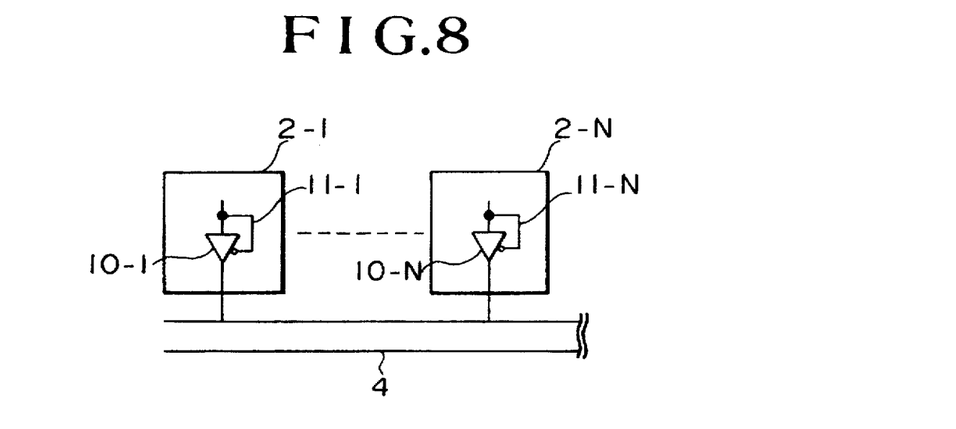

Further, other operation examples of the output control circuits 10-1 to 10-N in the first embodiment are described with reference to FIGS. 6, 7 and 8. The circuits of FIGS. 6, 7 and 8 are configured in accordance with the cases where the polarities for on and off states of the transmitting and receiving portion 8-1 to 8-N, the output control circuit 10-1 to 10-N and the switches 5-1 and 5-2 are different from those of the first embodiment. In FIGS. 6, 7 and 8, the timing adjustment circuits are not shown but the timing adjustment circuits can be connected to the outputs of the output control circuits 10-1 to 10-N.

FIG. 7 shows an example in which when the output enable signal of the output control circuit 10-1–10-N is at a high level, the output control circuit 10-1–10-N produces a high level signal onto the transmission control signal line 4. The output signal level of the output control circuit 10-1–10-N is changed only from the termination voltage level VTT to the high level and from the high level to the termination voltage level in the same manner as in the first embodiment. FIG. 8 shows an example in which when the output enable signal is at a low level, the output control circuit 10-1 to 10-N produces a low level signal onto the transmission control signal line 4. The output signal level of the output control circuit 10-1 to 10-N is changed only from the termination voltage level VTT to the low level and from the low level to the termination voltage level VTT. FIG. 6 shows an example in which the transmission control signal line 4 is not used differently from the above examples. All output signals of the output control circuits 10-1 to 10-N are input to an OR gate 9 and an output signal of the OR gate 9 is supplied to the termination circuit 30.

As described above, the circuit can be configured in accordance with the used polarities in the transmitting and receiving portions 8-1 to 8-N, the output control circuits 10-1 to 10-N and the switches 5-1 and 5-2.

In the embodiments, when the termination voltage level VTT becomes equal to the reference voltage for detecting data by the transmitting and receiving portion 8-1–8-N in the data processing unit 2-1–2-N or to a voltage close to the reference voltage and is left as it is, there is the possibility that a failure such as latch up occurs in the transmitting and receiving portion 8-1–8-N in the data processing unit when data is not transmitted or that the transmitting and receiving portion 8-1–8-N is broken due to a through current. In order to prevent this problem, the following two methods can be adopted.

(1) Method of providing an input hysteresis characteristic in the reference voltage of the transmitting and receiving portions 8-1 to 8-N; and (2) Method of setting so that the termination voltage level VTT is not coincident with the reference voltage of the transmitting and receiving portions 8-1 to 8-N.

Figure 13:
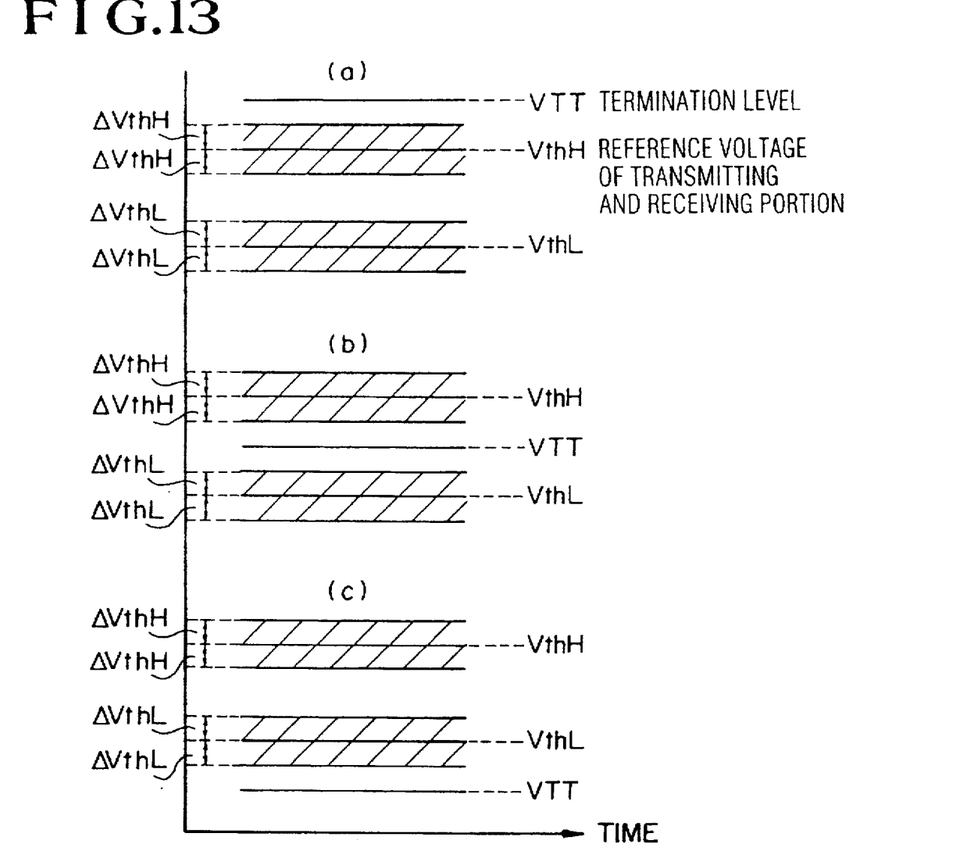
FIGS. 13 and 14 are diagrams illustrating the setting of a reference voltage of a transmitting and receiving portion.
Figure 14:
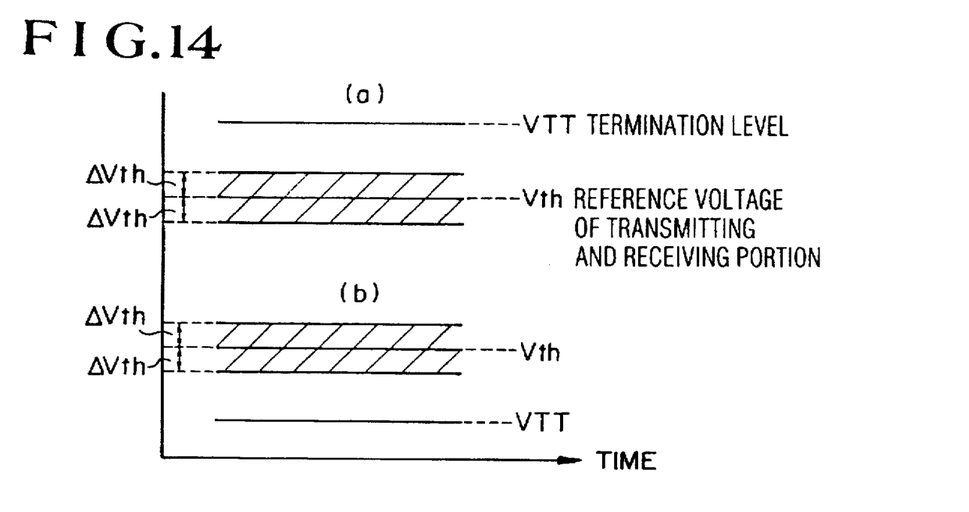

Referring now to FIGS. 13 and 14, the two methods mentioned above are described.

FIG. 13 shows an example of setting the reference voltage of the receiving circuit in the method described in the above item (1). In FIG. 13, VthH represents a reference voltage level in the transmitting and receiving portion 8-1–8-N in when a received signal is changed from a low level to a high level, and ΔthH represents a scattered value of the VthH. Further, VthL represents a reference voltage level in the receiving circuit when the received signal is changed from a high level to a low level, and ΔVthL represents a scattered value of the VthL. The termination voltage level can be set to a value other than VthH±ΔVthH or VthL ±ΔVthL and can be set as shown in (a) to (c) of FIG. 13. In other words, the transmitting and receiving portion 8-1–8-N detects data on the bus on the basis of the predetermined reference voltage value and in the termination circuit 30 the termination voltage level VTT is set to a potential other than the allowable range (±ΔVth) of the predetermined reference voltage (Vth).

Relation equations for the respective cases are given by the following equations (12):

For the case of FIG. 13(a);

$$VTT > VthH + \Delta VthH \ldots \quad (12)$$

For the case of FIG. 13(b);

$$VthL + \Delta VthL < VTT < VthH - \Delta VthH$$

For the case of FIG. 13(c);

$$VTT < VthL - \Delta VthL$$

For example, when VthH is 1.7 (V), VthL is 1.5 (V), and ΔVthH and ΔVthL are 50 (mV), VTT is set to satisfy any relation as described in the following equations (13):

For the case of FIG. 13(a);

$$VTT > 1.75 \text{ (V)} \ldots \quad (13)$$

For the case of FIG. 13(b);

$$1.55 \text{ (V)} < VTT < 1.65 \text{ (V)}$$

For the case of FIG. 13(c);

$$VTT < 1.45 \text{ (V)}$$

Further, by providing the hysteresis characteristic in the reference voltage, a noise margin is increased and a circuit immune to noise can be realized.

FIG. 14 shows an example of setting the reference voltage of the transmitting and receiving portion 8-1-8-N in the case of the method (2). In FIG. 14, Vth represents a reference voltage level in the transmitting and receiving portion 8-1–8-N, and ΔVth represents a scattered value of Vth. Since the termination voltage level VTT is set to a value other than Vth±ΔVth, the level VTT can be set as shown in (a) and (b) of FIG. 14. Relation equations for the respective cases are given by the following equations (14):

For the case of FIG. 14(a);

$$VTT > Vth + \Delta Vth \ldots \quad (14)$$

For the case of FIG. 14(b);

$$VTT < Vth - \Delta Vth$$

By setting the termination voltage level in this manner, a failure can be prevented.

As described above, according to the plurality of embodiments, since the impedance is matched upon transmission and reception of data, the reflection due to mismatching of the impedance can be suppressed and the low power consumption of the bus circuit can be attained when data is not transmitted.

Further, the bus line is extended by a length corresponding to at least threshold time until the resistance value of the termination circuit 30 is changed over after the enable signal from the data processing unit is transmitted to the termination circuit 30 to thereby change over the resistance value of the termination circuit from the high resistance to the resistance value near to the characteristic impedance when the data transmitted from a data processing unit onto the bus reaches the termination circuit 30. In addition, the resistance value of the termination circuit is maintained to the resistance value near to the characteristic impedance of the bus during at least the threshold time until the last data transmitted onto the bus reaches the terminal circuit 30 after the disable signal of the data processing unit is transmitted and the resistance value is then changed over to the high resistance value after an elapse of a fixed time, so that the reflection due to mismatching of the impedance of the connection portion between the bus line and the termination circuit 30 can be suppressed.

FIGS. 1, 2 and 10 illustrate that a plurality of data processing units 2-1 to 2-N are connected to a data bus 1 and the transmission control signal line 4 is connected to the termination resistors R1 to R4 of the termination circuit 30 through the switches 5-1 and 5-2, this configuration is also applicable to other data buses including data processing units, control signal line, switches and termination resistors.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A data bus circuit, comprising:

a plurality of data buses;

a plurality of data processing units connected to each of said data buses for performing transmission and reception of data in response to a transmission control signal;

at least one termination resistor connected to a termination end of each of said plurality of data buses, said termination resistor including first resistance means for suppressing reflection of signals on said plurality of data buses upon transmission and reception of data of said plurality of data processing units and second resistance means having a resistance value larger than that of said first resistance means;

output control means for producing said transmission control signal as to whether or not said plurality of data processing units perform transmission and reception of data; and changing-over means for changing over to connect said first resistance means to said data buses through which transmission and reception of data is performed when at least one of said plurality of data processing units performs transmission and reception of data in response to said transmission control signal and to connect said second resistance means to said data buses through which transmission and reception of data is not performed when many of said plurality of data processing units perform transmission and reception of data.

2. A data bus circuit, comprising:

a plurality of data buses;

a plurality of data processing units connected to each of said data buses for performing transmission and reception of data in response to a transmission control signal;

at least one termination resistor connected to a termination end of each of said plurality of data buses, said termination resistor including first resistance means for suppressing reflection of signals on said plurality of data buses upon transmission and reception of data of said plurality of data processing units and second resistance means having a resistance value larger than that of said first resistance means;

output control means for producing said transmission control signal as to whether or not said plurality of data processing units perform transmission and reception of data; and changing-over means for changing over to connect said first resistance means to said data buses through which transmission and reception of data is performed when at least one of said plurality of data processing units performs transmission and reception of data in response to said transmission control signal and to connect said second resistance means to said data buses through which transmission and reception of data is not performed when any of said plurality of data processing units does not perform transmission and reception of data, wherein said changing-over means includes:

transmission delay means for delaying data reaching to said termination resistor when said second resistance means is changed over to said first resistance means in response to said transmission control signal; and changing-over delay means for changing over from said first resistance means to said second resistance means after an elapse of a predetermined time after completion of transmission of data of said plurality of data processing units when said first resistance means is changed over to said second resistance means in response to said transmission control signal.

3. A data bus circuit according to claim 2, wherein a transmission time between a processing unit nearest to said termination resistor and said termination resistor is greater than the sum of time required for changing over said changing-over means and a transmission time for transmitting the transmission control signal between the processing unit nearest to said termination resistor and said termination resistor.

4. A data bus circuit according to claim 3, wherein said transmission delay means includes a data bus to provide a delay between said data processing unit nearest to said termination resistor and said termination resistor.

5. A data bus circuit according to claim 2, wherein said changing-over delay means includes a delay circuit connected to said output control means for holding said transmission control signal to delay changing from said first resistance means to said second resistance means.

6. A data bus circuit comprising:

a plurality of data buses:

a plurality of data processing units connected to each of said data buses for performing transmission and reception of data in response to a transmission control signal:

at least one termination resistor connected to a termination end of each of said plurality of data buses, said termination resistor including first resistance means for suppressing reflection of signals on said plurality of data buses upon transmission and reception of data of said plurality of data processing units and second resistance means having a resistance value larger than that of said first resistance means;

output control means for producing said transmission control signal as to whether or not said plurality of data processing units perform transmission and reception of data, wherein said transmission control signal produced by said output control means is due to enable and disable signals produced by said output control means itself or the presence of data transmitted on said data buses; and changing-over means for changing over to connect said first resistance means to said data buses through which transmission and reception of data is performed when at least one of said plurality of data processing units performs transmission and reception of data in response to said transmission control signal and to connect said second resistance means to said data buses through which transmission and reception of data is not performed when any of said plurality of data processing units does not perform transmission and reception of data.

7. A data bus circuit according to claim 6, wherein said output control means is included in each of said plurality of data processing units and produces an enable/disable signal.

8. A data bus circuit according to claim 6, wherein said output control means includes at least a comparator for comparing a voltage level of data transmitted on said data bus with a reference voltage to thereby produce said transmission control signal in accordance with a presence of data transmitted on said data bus.

9. A method of changing over a termination resistor of a data bus circuit which includes a plurality of data buses, a plurality of data processing units connected to each of said plurality of data buses for performing transmission of data in accordance with a transmission control signal, said termination resistor being provided in termination of said plurality of data buses and having first resistance means for suppressing reflection of signals on said plurality of data buses upon data transmission of said plurality of data processing units and second resistance means having a resistance value larger than that of said first resistance means, said termination resistor further being changed over in accordance with a data transmission state of said plurality of data buses, said method comprising the steps of:

(a) changing over from said second resistance means to said first resistance means when any of said plurality of data processing units transmit data on all of said plurality of data buses to connect said first resistance means to said plurality of data buses in order to suppress reflection of signals on said plurality of data buses;

(b) delaying data from reaching said termination circuit when said termination resistor is changed over from said second resistance means to said first resistance means; and (c) changing over from said first resistance means to said second resistance means after an elapse of a predetermined amount of time upon completion of data transmission of said plurality of data processing units when none of said plurality of data processing units perform transmission of data.

10. A method of changing over a termination resistor of a data bus circuit which includes a plurality of data buses, a plurality of data processing units connected to each of said plurality of data buses for performing transmission of data in accordance with a transmission control signal, said termination resistor being provided in termination of said plurality of data buses and having first resistance means for suppressing reflection of signals on said plurality of data buses upon data transmission of said plurality of data processing units and second resistance means having a resistance value larger than that of said first resistance means, said termination resistor further being changed over in accordance with a data transmission state of said plurality of data buses, said method comprising the steps of:

(a) changing over from said second resistance means to said first resistance means when any of said plurality of data processing units transmit data on all of said plurality of data buses to connect said first resistance means to said plurality of data buses in order to suppress reflection of signals on said plurality of data buses;

(b) delaying data from reaching said termination circuit when said termination resistor is changed over from said second resistance means to said first resistance means,
wherein in said step (b) when said second resistance means is changed to said first resistance means, said termination voltage level produced by a predetermined fixed voltage is held, so that said plurality of data processing units perform data transmission regardless of changing over from said second resistance means to said first resistance means; and (c) changing over from said first resistance means to said second resistance means after an elapse of a predetermined amount of time upon completion of data transmission of said plurality of data processing units.

11. A data bus circuit, comprising:

a plurality of data buses;

a plurality of data processing units connected to each of said data buses for performing transmission and reception of data in response to a transmission control signal;

at least one termination resistor connected to a termination end of each of said plurality of data buses,
said termination resistor including a first value and a second value, both of which are interchangeable in relation to said data buses, said first value being for suppressing reflection of signals on said plurality of data buses upon transmission and reception of data of said plurality of data processing units and said second value being larger than that of the first value;

output control means for producing said transmission control signal as to whether or not said plurality of data processing units perform transmission and reception of data; and changing-over means for changing over to connect said second value to said data buses when data is not transmitted on said data buses.

12. A data bus circuit, comprising:

a plurality of data buses;

a plurality of data processing units connected to each of said data buses for performing transmission and reception of data in response to a transmission control signal;

at least one termination resistor connected to a termination end of each of said plurality of data buses,
said termination resistor including first resistance circuit for suppressing reflection of signals on said plurality of data buses upon transmission and reception of data of said plurality of data processing units and second resistance circuit having a resistance value larger than that of said first resistance circuit;

output control circuit for producing said transmission control signal as to whether or not said plurality of data processing units perform transmission and reception of data; and changing-over circuit for changing over to connect said first resistance circuit to said data buses through which transmission and reception of data is performed when at least one of said plurality of data processing units performs transmission and reception of data in response to said transmission control signal and to connect said second resistance circuit to said data buses through which transmission and reception of data is not performed when any of said plurality of data processing units does not perform transmission and reception of data.

13. A data bus circuit, comprising:

a plurality of data buses;

a plurality of data processing units connected to each of said buses for performing transmission and reception of data in response to a transmission control signal;

at least one termination resistor connected to a termination end of each of said plurality of data buses,
said termination resistor including first resistance means for suppressing reflection of signals on said plurality of data buses upon transmission and reception of data of said plurality of data processing units and second resistance means having a resistance value larger than that of said first resistance means;

output control means for producing said transmission control signal as to whether or not said plurality of data processing units perform transmission and reception of data; and changing-over means for changing over to connect said first resistance means to said data buses through which transmission and reception of data is performed when at least one of said plurality of data processing units performs transmission and reception of data in response to said transmission control signal and to connect said second resistance means to said data buses through which transmission and reception of data is not performed when none of said plurality of data processing units perform transmission and reception of data, wherein a transmission time between a processing unit nearest to said termination resistor and said termination resistor is greater than the sum of time required for changing over said changing-over means and a transmission time for transmitting the transmission control signal between the processing unit nearest to said termination resistor and said termination resistor.

* * * * *